Patented July 14, 1942

2,289,590

UNITED STATES PATENT OFFICE 2,289,590

MERCURATED ALIPHATIC NITRILE

Anderson W. Ralston and Miles R. McCorkle, Chicago, Ill., assignors to Armour and Company, Chicago, Ill., a corporation of Illinois No Drawing. Application November 3, 1938, Serial No. 238,698

8 Claims. (Cl. 260—404)

This invention pertains to mercurated aliphatic nitriles, and it comprises as new materials mercurated aliphatic nitriles of the general formula

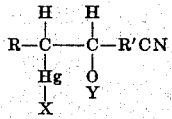

wherein R and R' are straight chain saturated or unsaturated alkyl groups, X is an acid radical such as halogen, cyano, nitro or acetate, and Y is hydrogen or an alkyl group containing five or less carbon atoms, it further comprises compounds of the above general formula wherein the group

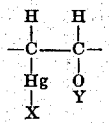

may be substituted for one or more —CH$_2$—CH$_2$— groups in the compound, it further comprises processes of preparing such mercurated nitriles wherein an unsaturated straight-chain nitrile is reacted with a mercury salt in the presence of water or an alcohol, and it further comprises weed-killing compositions containing such mercurated nitriles.

Organic mercurials are substances of general interest and their use as germicides and antiseptics is well known. Those organic mercurials soluble in organic solvents, such as hydrocarbons, are of particular interest.

We have now discovered a group of organic mercury-containing compounds which are oil soluble and which can be easily prepared from unsaturated aliphatic nitriles. These mercurated nitriles are characterized by the presence of the group

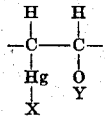

wherein X is an acid radical and Y is hydrogen or an alkyl group containing five or less carbon atoms. These compounds are generally heavy liquids or low melting solids, insoluble in water but soluble in organic solvents such as ether, alcohol, kerosene or benzene.

We have further discovered that, in addition to having germicidal properties, the mercurated nitriles of our invention are especially useful as weed-killers. They are specific for the removal of weeds having milk- or latex-containing roots, such as those belonging to the family of Compositae which includes thistles, dandelions, sunflowers; or those belonging to the family of Asclepiadaceae which includes milkweeds. We have found them to be especially useful in the control of weeds belonging to the genus Plantago. They are also useful for the eradication and control of the so-called "crab grass," which is a serious lawn pest in most localities. It is our belief that the root systems of the weeds which we have mentioned possess a specific affinity for the type of mercury derivatives we use, and that when these mercury compounds are sprayed upon the soil the root system of the weed specifically absorbs the compound thus resulting in the death of the root system. We attribute the non-destructive effect of our compounds upon grasses and other monocotyledonous plants to the fact that their root systems, being essentially different from those of the above mentioned weeds, do not possess the ability to absorb these compounds or that the absorption is of an entirely different order of magnitude from that of the less dense weed root. Thus we are enabled to kill the root system of a weed without seriously affecting the grass in close proximity.

We shall now give examples of how our new mercurated nitriles can be prepared, and will hereinafter more specifically describe weed-killing compositions containing the same.

EXAMPLE 1

*9-acetoxymercuri, 10-methoxy stearonitrile*

263 grams of oleonitrile are prepared by reacting ammonia with oleic acid in the liquid phase. The nitrile is placed in a three-necked flask equipped with a reflux condenser and stirrer. 750 grams of methanol and 350 grams of mercuric acetate are now added and the mixture refluxed for ten hours with constant stirring. The reaction mixture is then poured into water and extracted with ether. The ether solution is then washed with water and dried with sodium sulfate. The solution is filtered and the ether evaporated. The product consists of 470 grams of a heavy, reddish oil. The mercury content is 35.9%. Analysis shows it to be 9-acetoxymercuri, 10-methoxy stearonitrile, or its isomers.

EXAMPLE 2

*9-chloromercuri, 10-ethoxy stearonitrile*

263 grams of oleonitrile are refluxed for ten hours with 750 grams of ethyl alcohol and 298 grams of mercuric chloride. The reaction mixture is then poured into water and extracted with ether. From this ether solution is obtained 465 grams of a heavy oil soluble in organic solvents but insoluble in water. The compound contains 36.7% mercury. Complete analytical data shows it to be 9-chloromercuri, 10-ethoxy stearonitrile.

EXAMPLE 3

*1-acetoxymercuri, 2-methoxy undecanonitrile*

165 grams of 1,2-undecanonitrile are refluxed for ten hours with 500 grams of methanol and 350 grams of mercuric acetate. The reaction mixture is then poured into water and extracted with ether. The product is a low melting solid insoluble in water but soluble in organic solvents. Analysis shows it to be 1-acetoxymercuri, 2-methoxy undecanonitrile.

EXAMPLE 4

*9-acetoxymercuri, 10-butoxy stearonitrile*

263 grams of oleonitrile are reacted with 500 grams of butyl alcohol and 350 grams of mercuric acetate under the conditions described in Example 1. The product is a heavy, viscous liquid insoluble in water but soluble in organic solvents. Analysis shows it to be 9-acetoxymercuri, 10-butoxy stearonitrile.

EXAMPLE 5

*Mercurated linolenonitriles*

260 grams of nitriles are prepared from the fatty acids of linseed oil as previously described. These nitriles are treated with 250 grams of mercuric acetate and 750 grams of methanol according to the procedure given under Example 1. The product is a thick, yellowish, heavy oil insoluble in water but soluble in organic solvents. The mercury content corresponds to the presence of one mercury atom in the molecule.

EXAMPLE 6

*Mercurated linolenonitriles*

260 grams of the nitriles used in Example 5 are reacted with 675 grams of mercuric acetate and 750 grams of methanol as described under Example 1. The product is a low melting solid. The mercury content corresponds approximately to two mercury atoms in the molecule.

EXAMPLE 7

260 grams of nitriles prepared from fish oil fatty acids having an iodine number of 162 are treated with 500 grams of methanol and 350 grams of mercuric acetate as described under Example 1. The product is a heavy liquid insoluble in water but soluble in organic solvents.

In the examples given above, all of the mercurated aliphatic nitriles described are characterized by the presence of the group

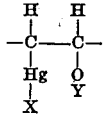

wherein X is an acid radical and Y is hydrogen or an alkyl group containing five or less carbon atoms. The general reaction for their preparation is as follows:

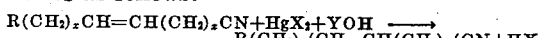
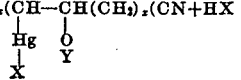

As described above, X may be any acid radical and a number of typical examples have been chosen. Thus it may be

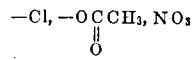

and Y may be hydrogen or an alkyl group containing five or less carbon atoms. Thus if the reaction is conducted in water the group OY will be hydroxyl and if the reaction is conducted in butyl alcohol the group OY will be butoxy. Thus, when mercuric chloride is used, X will be chlorine. When mercuric acetate is used X will be the acetate radical, etc.

Any unsaturated aliphatic nitrile having at least five carbon atoms attached to the —CN radical can be used as the nitrile starting material for the preparation of our products. In the above examples oleonitrile, linolenonitrile, unsaturated fish oil fatty acid nitriles and decanonitrile are given merely as examples. Other unsaturated fatty acid nitriles can be used, as will be apparent to those skilled in the art.

The compounds of the present invention are insoluble in water but soluble in organic solvents such as ether, alcohol, acetone, kerosene, etc. They are effective in germicidal ointments, and can be added to paints. When we wish to use our mercurated nitriles as weed-killers they are best dissolved in a suitable organic solvent such as kerosene. Suspensions in water can also be used, and either the organic solution or aqueous suspension sprayed over the ground areas to be treated.

We find kerosene solutions containing 0.5% of the compounds to be the most specific in killing power and to possess the greatest preferential killing for the weeds. Our experimental work shows satisfactory results with concentrations ranging from 0.001% to 1.0%. Where overall killing of plant growth is desired, higher concentrations may be employed. As stated, we have also applied our mercurated nitriles as water emulsions and find them to be effective, but for general use we prefer the use of hydrocarbon solutions. We can, of course, use a mixture of mercurated nitriles such as those obtained by mercurating the nitriles obtained from the fatty acids of fish oils.

For still other purposes it may be desirable to dispense our compositions in the form of dry powders. We can, for example, prepare mixtures containing 99.5% of inert solids, such as ground pumice, talc and the like, associated with about 0.5% of the mercurated aliphatic nitrile. Such powders can be dusted on the weed area.

Having thus described our invention, what we claim is:

1. Mercurated aliphatic nitriles containing the grouping

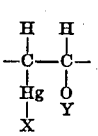

wherein X is an acid radical whose mercury salt is soluble in a solvent chosen from one of the group consisting of water and alcohol and Y is hydrogen or an alkyl group containing five or less carbon atoms.

2. Mercurated aliphatic nitriles containing seventeen carbon atoms in a straight chain attached to the —CN group and characterized by the presence of at least one

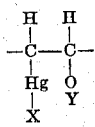

group in the molecule, wherein X is an acid radical whose mercury salt is soluble in a solvent chosen from one of the group consisting of water and alcohol and Y is hydrogen or an alkyl group containing five or less carbon atoms.

3. 9-acetoxymercuri, 10-methoxy stearonitrile.
4. 9-chloromercuri, 10-ethoxy stearonitrile.
5. 1-acetoxymercuri, 2-methoxy caprinitrile.
6. The process which comprises reacting an unsaturated straight-chain aliphatic nitrile with a salt of mercury in the presence of an aliphatic alcohol, the mercury salt being soluble in said alcohol.
7. The process which comprises reacting oleonitrile with a salt of mercury in the presence of an aliphatic alcohol, the mercury salt being soluble in said alcohol.
8. The process which comprises reacting mercuric acetate with an unsaturated aliphatic nitrile in the presence of an aliphatic alcohol.

ANDERSON W. RALSTON.
MILES R. McCORKLE.